United States Patent
Chen et al.

(10) Patent No.: US 9,046,963 B2
(45) Date of Patent: *Jun. 2, 2015

(54) REFLECTIVE MIRROR AND OPTICAL TOUCH DEVICE USING THE SAME

(75) Inventors: Hui-Hsuan Chen, Hsinchu (TW); Hung-Ching Lai, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 218 days.

This patent is subject to a terminal disclaimer.

(21) Appl. No.: 13/528,738

(22) Filed: Jun. 20, 2012

(65) Prior Publication Data
US 2013/0048839 A1    Feb. 28, 2013

(30) Foreign Application Priority Data

Aug. 30, 2011  (TW) .............................. 100216199 U
Feb. 1, 2012   (TW) .............................. 101103301 A

(51) Int. Cl.
*G01D 5/30*    (2006.01)
*G02B 5/124*   (2006.01)
*G06F 3/042*   (2006.01)
*G02B 5/12*    (2006.01)

(52) U.S. Cl.
CPC ................. *G06F 3/0428* (2013.01); *G02B 5/12* (2013.01)

(58) Field of Classification Search
CPC .......... G06F 3/0428; G02B 5/12; G02B 5/02; G02B 5/124; G02B 5/136; G02B 5/30
USPC .............. 250/221, 216, 239, 338.1, 340, 353; 345/175, 176; 349/58; 361/679.02, 361/679.21; 359/529, 530

See application file for complete search history.

(56) References Cited

U.S. PATENT DOCUMENTS

| | | | | |
|---|---|---|---|---|
| 5,200,851 | A * | 4/1993 | Coderre et al. | 359/351 |
| 6,021,559 | A * | 2/2000 | Smith | 29/557 |
| 6,253,442 | B1 * | 7/2001 | Benson et al. | 29/557 |
| 6,258,443 | B1 * | 7/2001 | Nilsen et al. | 428/156 |
| 6,517,923 | B1 * | 2/2003 | Nakayama et al. | 428/68 |
| 6,556,189 | B1 * | 4/2003 | Takahata et al. | 345/173 |
| 7,098,976 | B2 * | 8/2006 | Minoura et al. | 349/113 |
| 8,248,691 | B2 * | 8/2012 | Wei et al. | 359/350 |
| 8,596,801 | B2 * | 12/2013 | Smith et al. | 359/530 |

(Continued)

FOREIGN PATENT DOCUMENTS

| | | |
|---|---|---|
| CN | 201698383 U | 1/2011 |
| CN | 201858541 U | 6/2011 |

(Continued)

*Primary Examiner* — John Lee
(74) *Attorney, Agent, or Firm* — Cheng-Ju Chiang

(57) ABSTRACT

A reflective minor includes a reflective film, a light-transmitting base and a light-transmitting adhesive layer. The reflective film includes a first connection surface and a plurality of reflection structures opposite to the first connection surface. Each reflection structure protrudes away from the first connection surface. The light-transmitting base includes a light penetration surface and a second connection surface opposite to the light penetration surface. The light-transmitting adhesive layer is disposed between the reflective film and the light-transmitting base and connected to the first connection surface and the second connection surface. An optical touch device is also provided in the present invention. Thus, the reflective minor as well as the optical touch device are easy to be manufactured and accordingly have a lower production cost.

22 Claims, 5 Drawing Sheets

(56) References Cited

U.S. PATENT DOCUMENTS

| | | | |
|---|---|---|---|
| 8,624,876 B2* | 1/2014 | Yu et al. | 345/175 |
| 8,659,561 B2* | 2/2014 | Yu | 345/173 |
| 8,659,578 B2* | 2/2014 | Yu et al. | 345/175 |
| 2001/0048169 A1* | 12/2001 | Nilsen et al. | 264/2.5 |
| 2005/0185279 A1* | 8/2005 | Mullen et al. | 359/530 |
| 2007/0171529 A1* | 7/2007 | Chuang | 359/530 |
| 2007/0242334 A1* | 10/2007 | Selbrede et al. | 359/222 |
| 2008/0117359 A1* | 5/2008 | Yoon et al. | 349/64 |
| 2008/0187678 A1* | 8/2008 | Fleming et al. | 427/488 |
| 2009/0213093 A1* | 8/2009 | Bridger | 345/175 |
| 2009/0295755 A1* | 12/2009 | Chapman et al. | 345/175 |
| 2009/0296202 A1* | 12/2009 | Wei et al. | 359/359 |
| 2010/0094584 A1 | 4/2010 | Su et al. | |
| 2010/0253916 A1* | 10/2010 | Gao et al. | 353/7 |
| 2010/0259948 A1 | 10/2010 | Chang | |
| 2010/0302196 A1* | 12/2010 | Han et al. | 345/173 |
| 2010/0309169 A1* | 12/2010 | Lieberman et al. | 345/175 |
| 2011/0141062 A1* | 6/2011 | Yu et al. | 345/175 |
| 2011/0148819 A1* | 6/2011 | Yu | 345/175 |
| 2011/0228392 A1* | 9/2011 | Yang et al. | 359/530 |
| 2011/0242141 A1* | 10/2011 | Yamakita et al. | 345/690 |
| 2011/0254809 A1* | 10/2011 | Yu et al. | 345/175 |
| 2012/0056807 A1* | 3/2012 | Chapman et al. | 345/158 |
| 2012/0182615 A1* | 7/2012 | Vasylyev | 359/530 |
| 2013/0021299 A1* | 1/2013 | Chen | 345/175 |
| 2013/0048839 A1* | 2/2013 | Chen et al. | 250/216 |
| 2013/0155025 A1* | 6/2013 | Lai et al. | 345/175 |
| 2013/0215084 A1* | 8/2013 | Jensen | 345/175 |

FOREIGN PATENT DOCUMENTS

| | | |
|---|---|---|
| TW | M359723 U | 6/2009 |
| TW | 200951502 A1 | 12/2009 |
| TW | 201007286 A | 2/2010 |
| TW | 201035632 A1 | 10/2010 |
| TW | 201037416 A1 | 10/2010 |
| WO | 2011072219 A2 | 6/2011 |

* cited by examiner

REFLECTIVE MIRROR AND OPTICAL TOUCH DEVICE USING THE SAME

TECHNICAL FIELD

The present invention relates to an optical component and a touch device, and more particularly to a reflective mirror and an optical touch device using the same.

BACKGROUND

Due to having advantages such as easy-to-operation, in recent years touch devices have been widely used in a variety of electronic products, such as mobile phones, digital cameras, music players, tablet computers, satellite navigation devices and touch panels. Basically, the present touch devices can be categorized to: resistive type, capacitive type and optical type. Because having a relatively better durability and a lower cost, optical touch devices accordingly have drawn more and more attention.

FIG. 1 is a schematic structure view of a conventional optical touch device. As shown, the conventional optical touch device 100 includes a light guide assembly 110, a light emitting component 120 and a light sensing component 130. The light guide assembly 110 includes two light guide strips 112a, 112b and a reflective mirror 114. The light guide strips 112a, 112b and reflective mirror 114 are arranged respectively along three of four sides of a rectangular trajectory. In particular, the light guide strip 112a and the reflective mirror 114 are disposed to be opposite to each other; the light guide strip 112b is disposed to be connected between the light guide strip 112a and the reflective mirror 114; and the area within the rectangular trajectory is defined to as a sensing area 116 of the optical touch device 100. The light emitting component 120 is disposed between the adjacent two ends of the light guide strips 112a, 112b and configured to provide light into the light guide strips 112a, 112b. The light guide strips 112a, 112b each are configured to convert the light, provided from the light emitting component 120, into a linear light source for the entire sensing area 116. In addition, the light sensing component 130 is disposed adjacent to one end of the light guide strip 112a.

The light sensing component 130 is configured to detect a light blocking object (for example, a user's finger) in the sensing area 116 and determine the light blocking object' position in the sensing area 116. Specifically, if a touch point (or, a light blocking object) A is located in the sensing area 116, a corresponding mirror point A1 will be formed on the reflective mirror 114 and accordingly a dark point A2, derived from the touch point A, and a dark point A3, derived from the mirror point A1, are generated. As such, through the light sensing component 130 detecting the dark points A2, A3 so as to obtain the optical information thereof, the position of the touch point A in the sensing area 116 can be determined. The means for the determination of a touch point's position are apparent to those ordinarily skilled in the art, and no any unnecessary detail will be given here.

FIG. 2 is a schematic cross-sectional view of the optical touch device in the FIG. 1 along a line I-I. Please refer to FIGS. 1, 2. The reflective mirror 114 in the conventional optical touch device 100 has a reflective surface 117, which is a flat mirror surface and configured to reflect light 122, and a bottom surface 118, which is designed to be parallel to a plane (for example, a XY-plane) defined by the X-axis and Y-axis. However, as illustrated in FIG. 2, if a bearing substrate (not shown) configured to support the optical touch device 100 bends and thereby resulting in the bottom surface 118 of the reflective mirror 114 not being parallel to the XY-plane, the light 122', derived from the light 122 and reflected by the reflective surface 117, may not successfully emit into the area capable of being sensed by the light sensing component 130. Thus, the optical touch device 100 may not work properly.

For solving the above problem, the reflective mirror 114 can be replaced by the reflective mirror 140 shown in FIG. 3. As shown, the reflective mirror 140 has a light incident surface 142 and a plurality of reflective pillars 143; in particular, the light incident surface 142 is opposite to the reflective pillars 143. Each reflective pillar 143 has, for example, a triangular structure and protrudes away from the light incident surface 142. Through this specific structure of the reflective pillar 143, the light 122', emitted out from the reflective mirror 140, can be adjusted to be parallel to the light 122, to be emitted into the reflective mirror 140 on a plane (for example, a YZ-plane) defined by the Y-axis and Z-axis, so as to prevent the associated optical touch device from working improperly resulted from a bent bearing substrate.

Basically, the reflective mirror 140 can be produced by either an injection molding mean or an extrusion molding mean. However, if the injection molding mean is employed, the various-sized reflective mirror moulds for the production of various-sized optical touch devices are required and accordingly a relatively high mould cost is resulted in. Alternatively, if the extrusion molding mean is employed, a reflective pillar 143 having a shape not qualified for requirements may be produced. For example, the top-angle θ 1 of the reflective pillar 143 may not exactly equal to 90 degrees; and thus, the reflective mirror 140 may have an affected light reflection effect.

SUMMARY OF EMBODIMENTS

Therefore, one object of the present invention is to provide a reflective mirror having a lower cost.

Another object of the present invention is to provide an optical touch device having a lower cost.

The present invention provides a reflective minor, which includes a reflective film, a light-transmitting base and a light-transmitting adhesive layer. The reflective film includes a first connection surface and a plurality of reflection structures opposite to the first connection surface. Each reflection structure protrudes away from the first connection surface. The light-transmitting base includes a light penetration surface and a second connection surface opposite to the light penetration surface. The light-transmitting adhesive layer is disposed between the reflective film and the light-transmitting base and connected to the first connection surface and the second connection surface.

In an embodiment of the present invention, the reflective film is a prism film. Each reflection structure is a prism pillar. The prism pillars are arranged to be parallel to each other. Each two adjacent prism pillars are connected to each other.

In an embodiment of the present invention, each reflection structure is a triangular pillar.

In an embodiment of the present invention, each reflection structure has a top-angle ranged from 86 to 94 degrees.

In an embodiment of the present invention, the first connection surface is rectangular and has two long sides and two short sides. A long-axis direction of each reflection structure is parallel to the long sides of the first connection surface.

In an embodiment of the present invention, the light-transmitting base further comprises a diffusion structure disposed on the light penetration surface.

In an embodiment of the present invention, the reflection structures corporately define a light reflection region and a light penetration region. Each reflection structure includes at least a reflective surface. The light reflection region includes the reflective surface.

In an embodiment of the present invention, each reflection structure includes two reflective surfaces. The two reflective surfaces are relatively tilted and connected to each other. Each two adjacent prism pillars are configured to have a gap therebetween. The light penetration region includes the gap.

In an embodiment of the present invention, each reflection structure includes two reflective surfaces and a light penetration part. The two reflective surfaces are relatively tilted to each other. The light penetration part is connected between the two reflective surfaces. The light penetration region includes the light penetration part.

In an embodiment of the present invention, each reflection structure has a top surface, on which a plurality of V-shaped grooves are disposed. The reflective surfaces include the groove walls of the V-shaped grooves. Each two adjacent reflection structures are configured to have a gap therebetween. The light penetration region includes the gap.

The present invention further provides an optical touch device defined with a sensing area. The optical touch device includes at least one aforementioned reflective mirror, a light source module and a light sensing module. Each reflective mirror is disposed beside a side of the sensing area. The light-transmitting base includes a light penetration surface facing to the sensing area. The light source module is disposed beside the sensing area and configured to provide light to the sensing area. The light sensing module disposed beside the sensing area and has a field of view of at least one reflective mirror.

Summarily, in the reflective mirror according to the present invention, because the reflective film can be directly obtained from cutting a prism sheet, which is commonly used in the existing liquid crystal display device industry, without the mold development costs, the reflective film as well as the associated optical touch device accordingly can have a lower production cost.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 4:
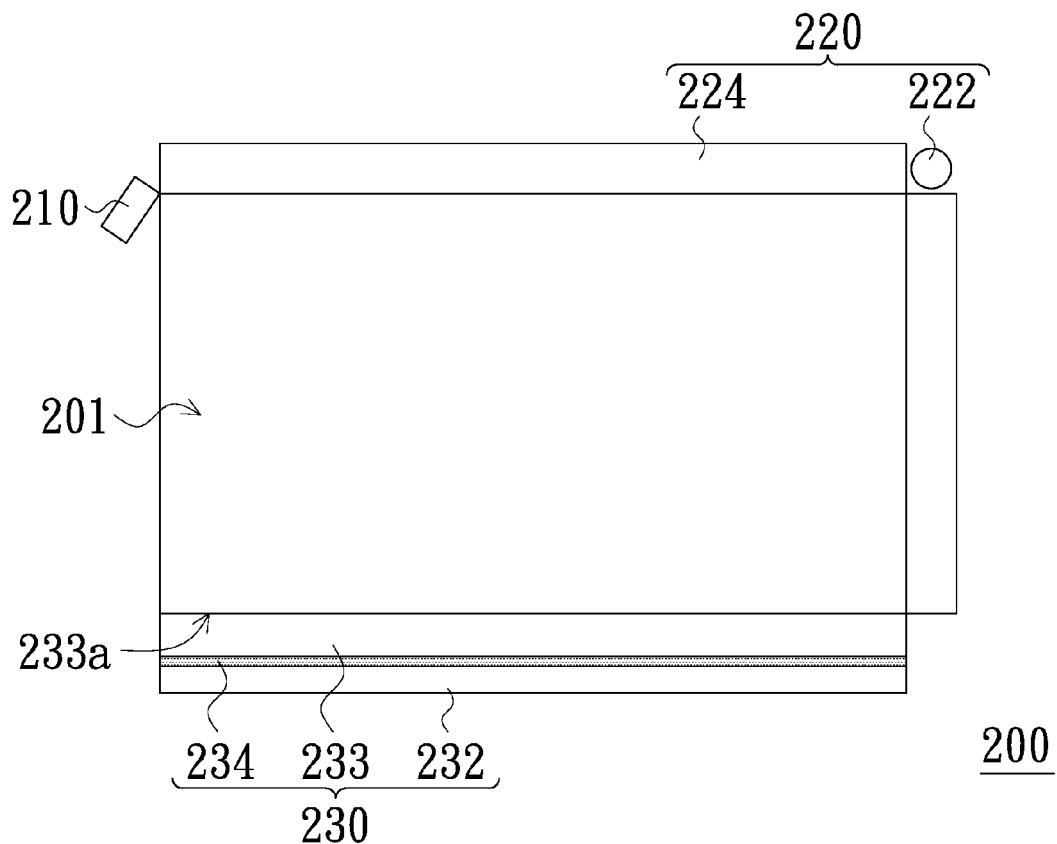
FIG. 4 is a schematic top view of an optical touch device in accordance with an embodiment of the present invention.

FIG. 4 is a schematic top view of an optical touch device in accordance with an embodiment of the present invention. As shown, the optical touch device 200 is defined with a sensing area 201 and includes a light sensing module 210, a light source module 220 and at least one reflective minor 230. The light sensing module 210 is disposed beside the sensing area 201 and has a field of view (FOV) of the entire sensing area 201 and the reflective minor 230. The light sensing module 210 is configured to sense a light blocking object (for example, a user's finger). The light source module 220 is disposed beside the sensing area 201 and configured to provide light into the sensing area 201. The reflective mirror 230 is disposed beside the sensing area 201 and configured to generate mirror images.

In this embodiment, the light sensing module 210 includes a light sensing component (not shown), which is a complementary metal oxide semiconductor (CMOS) image sensor, a charge coupled device (CCD) or other types of suitable light sensing component. The light source module 220 includes a light emitting component 222 and two light guide components 224. The two light guide components 224 are disposed beside two adjacent sides of the sensing area 201, respectively. The light emitting component 222 is disposed between the two light guide components 224 and to which the light emitting component 222 is configured to provide light. Each light guide component 224 is, for example, a light emitting diode, laser diode or other types of suitable point light source, and configured to direct the light emitted from the light emitting component 222 to the sensing area 201.

It is to be noted that the number and position of the light sensing component in the light sensing module 210, the numbers and positions of the light emitting component 222 and the light guide component 224 in the light source module 220 as well as the number and position of the reflective mirror 230 in the optical touch device 200 are given by way of example, and no limitation. In other words, the numbers and positions of the light sensing component, light emitting component 222, light guide component 224 and reflective mirror 230 can be adjusted according to actual design requirements in another embodiment. In addition, the light source module 220 in this embodiment is exemplified by being constituted by the light emitting component 222 and the light guide components 224 configured to work corporately with each other; however, the light source module 220 in another embodiment can be constituted by, without the light guide component(s), a light emitting component(s) and a strip reflective mirror(s) configured to work corporately with each other. In addition, the sensing area 201 may be defined on a surface of a bearing substrate (not shown), which is a glass substrate or other types of rigid substrate, and on which the light sensing module 210, the light source module 220 and the reflective mirror 230 are disposed. In another embodiment, the bearing substrate is a display panel, and accordingly the optical touch device 200 is a touch display device due to being integrated with a display panel.

Figure 5:
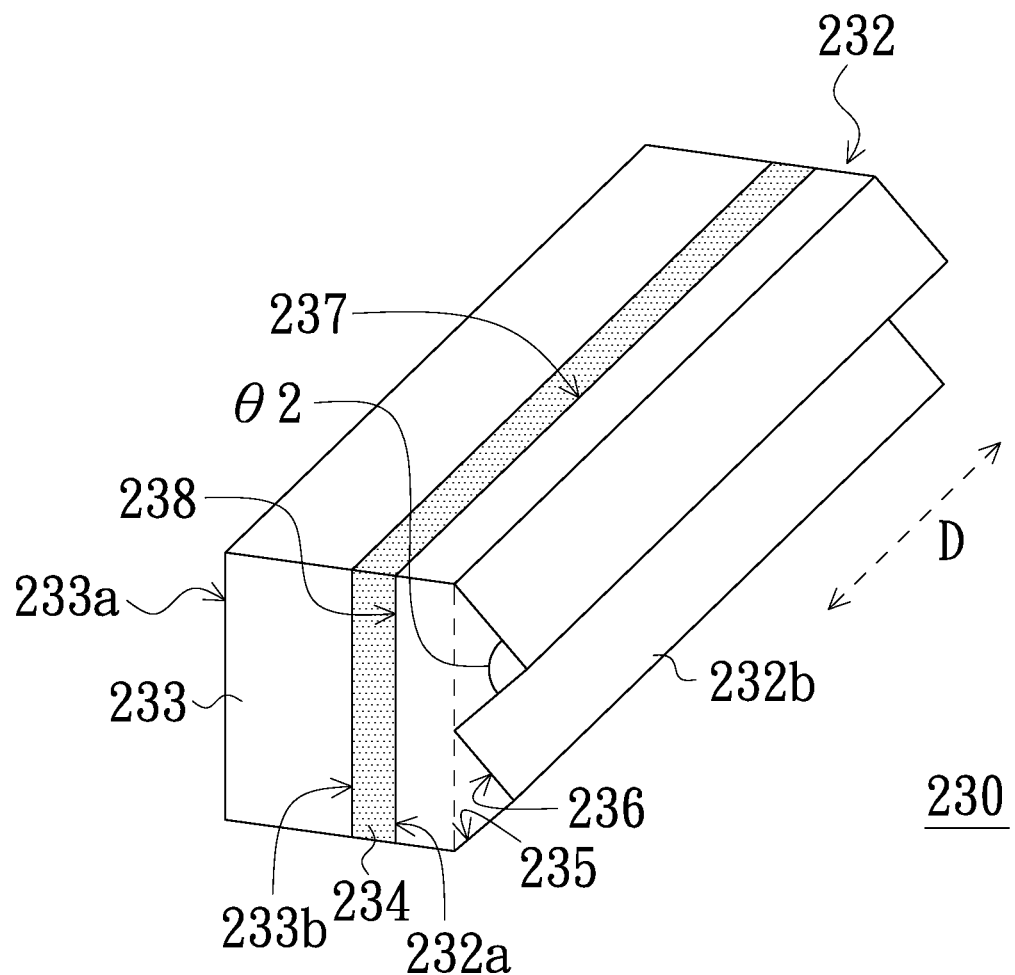
FIG. 5 is a schematic three-dimensional view of the reflective minor in the optical touch device illustrated in FIG. 4.

FIG. 5 is a schematic three-dimensional view of the reflective mirror 230 in the optical touch device 200 illustrated in FIG. 4. As shown in FIGS. 4, 5, the reflective mirror 230 in this embodiment includes a reflective film 232, a light-transmitting base 233 and a light-transmitting adhesive layer 234. The reflective film 232 has a first connection surface 232a and a plurality of reflection structures 232b; in particular, the first connection surface 232a is opposite to the reflection structures 232b, and each reflection structure 232b protrudes away from the first connection surface 232a. The light-transmitting base 233 has a light penetration surface 233a and a second connection surface 233b; in particular, the light penetration surface 233a and the second connection surface 233b are opposite to each other, and the light penetration surface 233a faces to the sensing area 201. The light-transmitting adhesive layer 234 is disposed between the reflective film 232 and the light-transmitting base 233 and connected to the first connection surface 232a of the reflective film 232 and the second connection surface 233b of the light-transmitting base 233.

In this embodiment, the reflection structures 232b each are, for example, a prism pillar. These prism pillars are arranged to be parallel to each other, and each two adjacent prism pillars are connected to each other. Each reflection structure 232b (or, each prism pillar) is, for example, a triangular pillar; however, it is to be noted that the above description about the structure of the reflection structure 232b is given by way of example, and no limitation. Each reflection structure 232b has a top-angle θ 2, ranged from 86 to 94 degrees; however, it is to be noted that the top-angle θ 2 can be adjusted according to an actual design requirement, and specifically the top-angle θ 2 is designed to 90 degrees in one embodiment. In addition, each reflection structure 232b further has a first inner surface 235 and a second inner surface 236. The first inner surface 235 and the second inner surface 236 each can function as a mirror surface, and the top-angle θ 2 is the intersection angle thereof The first connection surface 232a is rectangular and has two long sides 237 and two short sides 238. The long-axis direction D of each reflection structure 232b is parallel to the long sides 237 of the first connection surface 232a. In this embodiment, because the reflective film 232 can be directly obtained from cutting a prism sheet, which is commonly used in the existing liquid crystal display (LCD) device industry, the reflective film 232 as well as the optical touch device 200 accordingly can have a lower cost. In addition, although FIG. 5 is exemplified by two reflection structures 232b only, it is understood that the present invention does not limit the number of the reflection structure 232b.

The light-transmitting base 233 is a rectangular structure capable of being emitted through by light. Because having a relatively simple structure, the light-transmitting base 233 can be pre-produced by an extrusion molding mean or directly cut from provided light-transmitting materials, and accordingly the light-transmitting base 233 as well as the optical touch device 200 can have a lower cost. The reflective film 232 and the light-transmitting base 233 can be bonded to each other through the light-transmitting adhesive layer 234. The light-transmitting base 233 is configured to support the reflective film 232 so as to prevent the reflective film 232 from a deformation. In addition, the light-transmitting adhesive layer 234 is transparent liquid glue or transparent solid glue.

Figure 1:
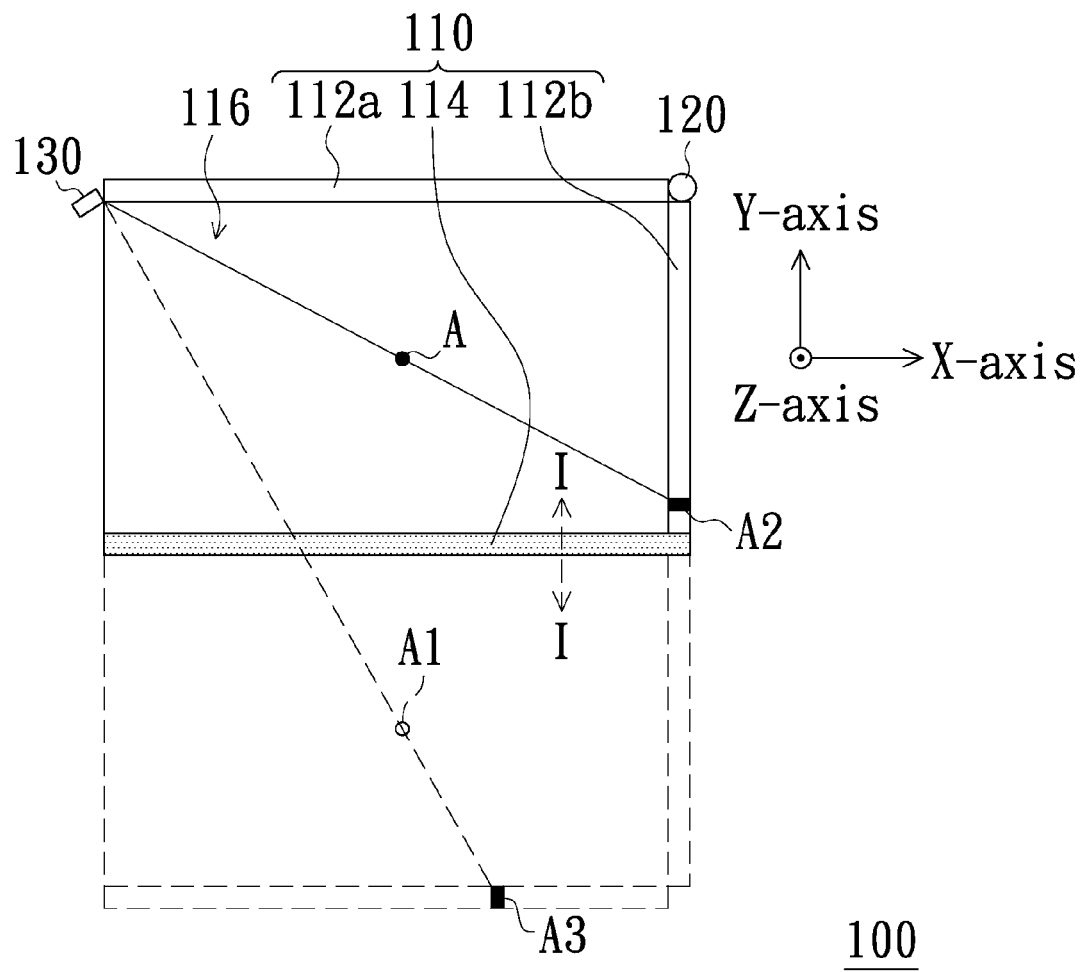
FIG. 1 is a schematic structure view of a conventional optical touch device.
Figure 2:
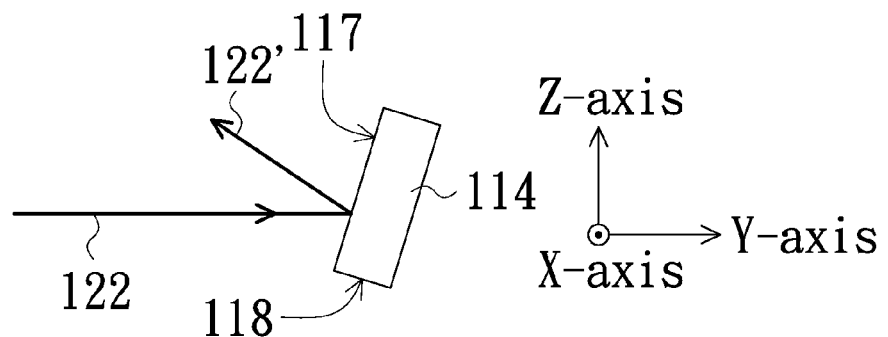
FIG. 2 is a schematic cross-sectional view of the optical touch device in the FIG. 1 along a line I-I.
Figure 3:
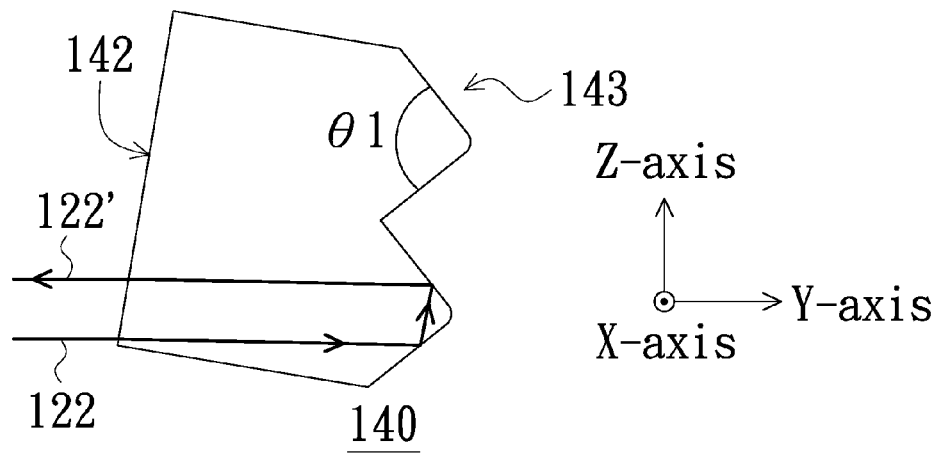
FIG. 3 is a schematic cross-sectional view of a conventional reflective mirror.

In this embodiment, the reflective film 232 and the light-transmitting base 233 are manufactured individually and then boned to each other through the light-transmitting adhesive layer 234. Therefore, because the reflective film 232 can be directly obtained from cutting a prism sheet, which is commonly used in the existing liquid crystal display device industry, without the mold development costs, the reflective film 232 accordingly can have a lower cost. Moreover, because having a relatively simple structure, the light-transmitting base 233 can be produced by an extrusion molding mean or directly cut from provided light-transmitting materials. In summary, the reflective mirror 230 in this embodiment can, compared with the conventional reflective mirror 140 shown in FIG. 3, save the mold development costs so as to have a lower production cost; in addition, the reflective mirror 230 further has the advantages of easy-to-manufacture. Moreover, because the reflective film 232 in this embodiment can be obtained from directly cutting a prism sheet used in a liquid crystal display device, the issue of the reflection structures 232b having an unqualified shape and thereby resulting in a poor light reflection effect is avoided.

Figure 6:
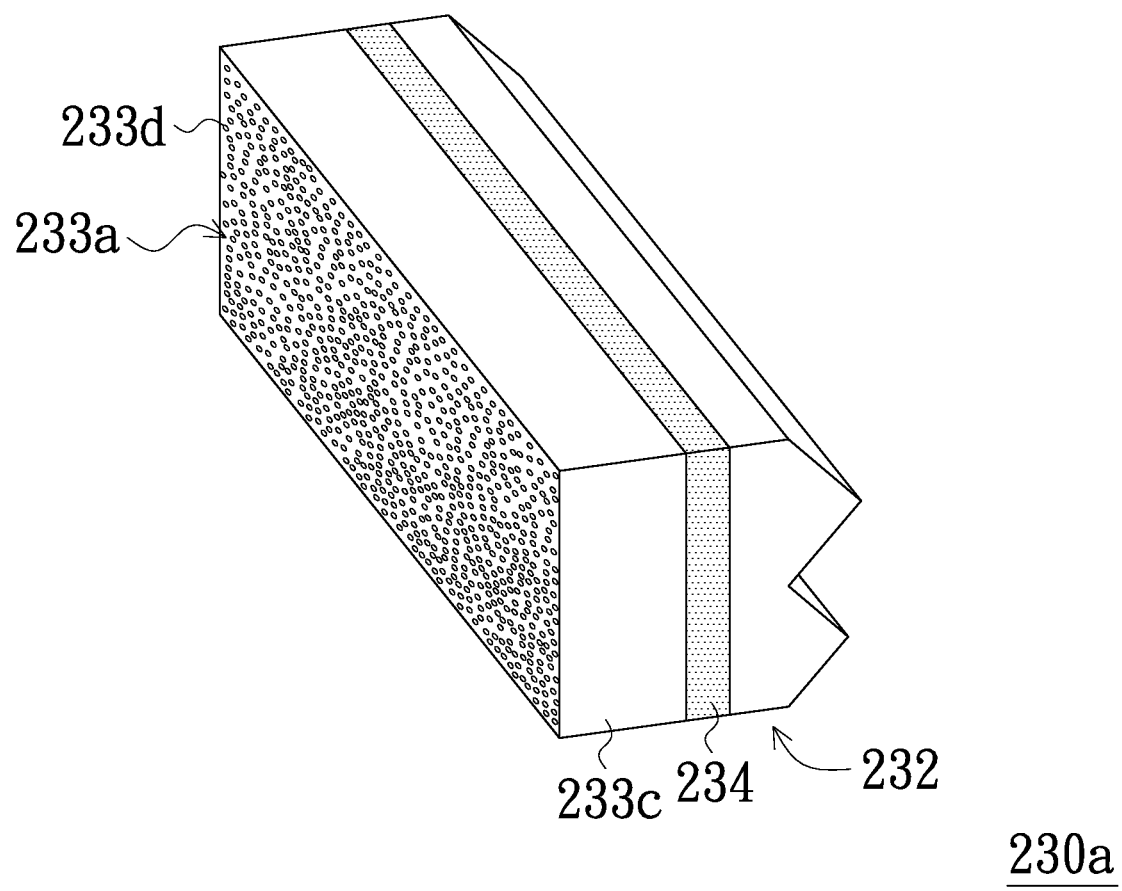
FIG. 6 is a schematic three-dimensional view of a reflective minor in accordance with another embodiment of the present invention.

FIG. 6 is a schematic three-dimensional view of a reflective mirror in accordance with another embodiment of the present invention. As shown, the reflective mirror 230a in this embodiment has a structure similar to that of the reflective mirror 230 in FIG. 5; the main difference between the two is that the light-transmitting base 233c of the reflective mirror 230a further has a diffusion structure 233d. The diffusion structure 233d is disposed on the light penetration surface 233a and configured to homogenize the light to be emitted into a sensing area. The diffusion structure 233d in this embodiment is, for example, constituted by a plurality of diffusion particles, and these diffusion particles are, given by way of example and no limitation, disposed on the light penetration surface 233a by a doping mean. The diffusion particles contain materials such as resin (for example, dipentaerythritol hexaacrylate, DPHA) or silica, and no limitation. In addition, the reflective mirror 230 in FIG. 5 can be replaced by this reflective mirror 230a.

Figure 7:
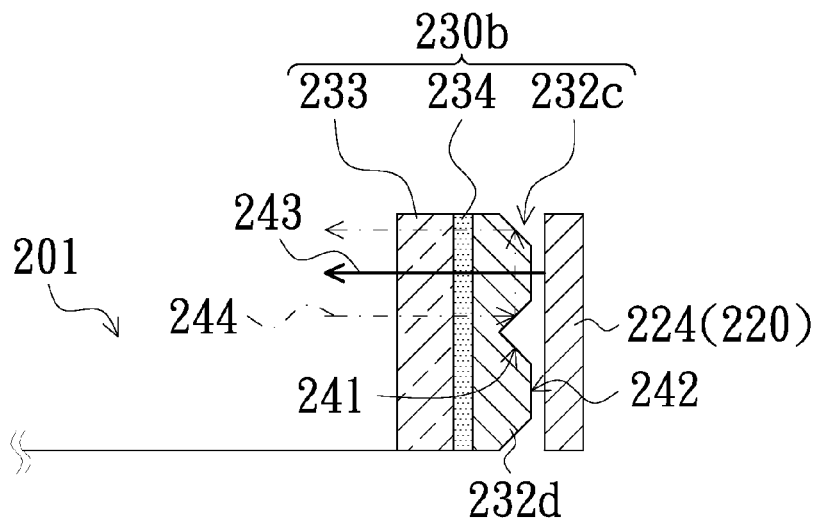
FIG. 7 is a schematic partial cross-sectional view of an optical touch device in accordance with another embodiment of the present invention.

FIG. 7 is a schematic partial cross-sectional view of an optical touch device in accordance with another embodiment of the present invention. As shown, in the optical touch device according to this embodiment, the reflective mirror 230b is disposed between the light source module 220 and one side of the sensing area 201. In particular, the reflective mirror 230b has its reflective film 232c adjacent to one of the light guide components (for example, the light guide component 224) of the light source module 220. The reflection structures 232d of the reflective film 232c corporately define a light reflection region and a light penetration region. Each reflection structure 232d has at least one reflective surface 241, and the light reflection region of the reflective film 232c includes the reflective surface 241. In this embodiment, each reflection structure 232d is exemplified by having two reflective surfaces 241, which are relatively tilted to each other. Each reflection structure 232d further includes a light penetration part 242 connected between the two associated reflective surfaces 241, and the light penetration region of the reflective film 232c includes the light penetration part 242. In addition, each two adjacent reflection structures 232d are, for example, connected to each other.

In this embodiment, the light guide component 224 adjacent to the reflective mirror 230b and other associated light guide components (not shown) of the light source module 220 are configured to emit light sequentially. When the light guide component 224 is configured to be emitting light 243, the light 243 firstly penetrates through the reflective film 232c through the light penetration region thereof, then sequentially penetrates through the light-transmitting adhesive layer 234 and the light-transmitting base 233, then enters into the sensing area 201 and eventually can be sensed by the light sensing module (not shown) of the optical touch device. And thus, the light sensing module can sense the first optical information of a light blocking object (not shown) if meanwhile the light blocking object is being located in the sensing area 201. Alternatively, when the light guide component 224 is configured not to be emitting light but any other light guide component is configured to be emitting light into the sensing area 201, the light 244 emitted from the sensing area 201 can be sequentially reflected by the two reflective surfaces 241 of the reflection structure 232d and eventually emitted back to the sensing area 201. In other words, the reflective film 232c can function as, while the adjacent light guide component is configured not to being emitting light, a reflective mirror so as to produce mirror images. Thus, when a light blocking object is located in the sensing area 201, the light sensing module can sense the second optical information of the light blocking object according to the mirror images. As such, the position of the light blocking object in the sensing area 201 can be determined according to the first optical information and the second optical information.

The above description of the reflective mirror structure having the light penetration and light reflection features is given by way of example, and no limitation. Other possible reflective mirror structures will be given in the following embodiments.

Figures 8, 9:
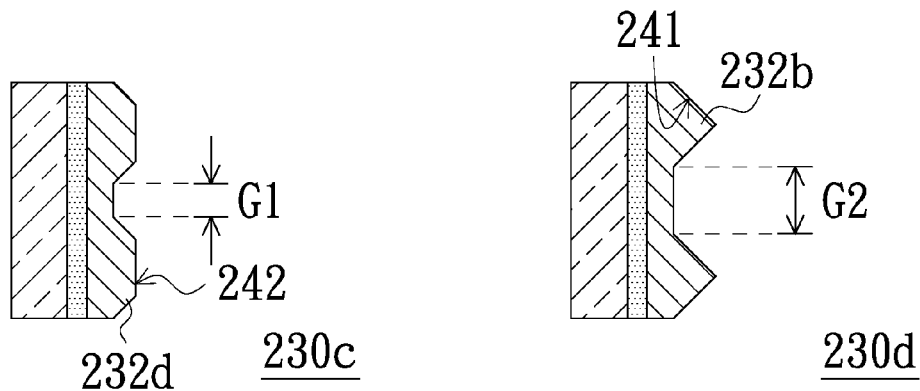
FIG. 8 is a schematic cross-sectional view of a reflective minor in accordance with another embodiment of the present invention.
FIG. 9 is a schematic cross-sectional view of a reflective minor in accordance with another embodiment of the present invention.

FIG. 8 is a schematic cross-sectional view of a reflective mirror in accordance with another embodiment of the present invention. As shown, the reflective mirror 230c in this embodiment has a structure and function similar to that of the reflective mirror 230b in FIG. 7; and the main difference between the two is that each two adjacent reflection structures 232d in the reflective mirror 230c are configured to have a gap G1 therebetween. In particular, the light penetration region of the reflective mirror 230c includes the light penetration part 242 of the reflection structure 232d and the gap G1.

FIG. 9 is a schematic cross-sectional view of a reflective mirror in accordance with another embodiment of the present invention. As shown, in the reflective mirror 230d according to this embodiment, each reflection structure 232b has two reflective surfaces 241, which are relatively tilted and connected to each other; in particular, the light penetration region of the reflective mirror 230d includes these reflective surfaces 241. In addition, each two adjacent reflection structures 232b in the reflective mirror 230d are configured to have a gap G2 therebetween; in particular, the light penetration region of the reflective mirror 230d includes the gap G2.

Figure 10:
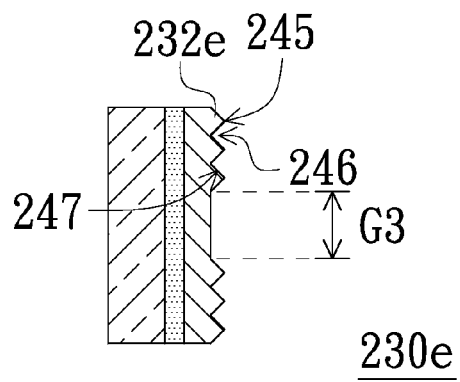
FIG. 10 is a schematic cross-sectional view of a reflective minor in accordance with another embodiment of the present invention.

FIG. 10 is a schematic cross-sectional view of a reflective mirror in accordance with another embodiment of the present invention. As shown, in the reflective mirror 230e according to this embodiment, each reflection structure 232e has a top surface 245, on which a plurality of V-shaped grooves 246 are disposed. Each V-shaped groove 246 has two groove walls 247, and each functions as a reflective surface; in particular, the light reflection region of the reflective mirror 230e includes these reflective surfaces (or, these groove walls 247). In addition, each two adjacent reflection structures 232e in the reflective mirror 230e are configured to have a gap G3 therebetween; in particular, the light penetration region of the reflective mirror 230e includes the gap G3.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reflective mirror, adapted to be used in an optical touch device defined with a sensing area, the optical touch device includes a light source module to provide light to the sensing area, the reflective mirror comprising:
    a reflective film comprising a first connection surface and a plurality of reflection structures opposite to the first connection surface, the reflection structures adjacent to the light source module, each reflection structure protruding away from the first connection surface, each reflection structure including a light reflection region and a light penetration region, the light reflection region alternatively arranged with the light penetration region, each reflection structure including at least a reflective surface connected to the light penetration region, and the light reflection region including the reflective surface;
    a light-transmitting base comprising a light penetration surface and a second connection surface opposite to the light penetration surface; and
    a light-transmitting adhesive layer disposed between the reflective film and the light-transmitting base and connected to the first connection surface and the second connection surface;
    wherein the light provided by the light source module is capable of passing through the light penetration region and thereby emitted to the light sensing area.

2. The reflective mirror according to claim 1, wherein the reflective film is a prism film, each reflection structure is a prism pillar, the prism pillars are arranged to be parallel to each other, and each two adjacent prism pillars are connected to each other.

3. The reflective mirror according to claim 2, wherein each reflection structure is a triangular pillar.

4. The reflective mirror according to claim 3, wherein each reflection structure has a vertex-angle ranged from 86 to 94 degrees.

5. The reflective mirror according to claim 2, wherein the first connection surface is rectangular and has two long sides and two short sides, each reflection structure has a long-axis parallel to the long sides of the first connection surface.

6. The reflective mirror according to claim 1, wherein the light-transmitting base further comprises a diffusion structure disposed on the light penetration surface.

7. The reflective mirror according to claim 1, wherein each reflection structure comprises two reflective surfaces, the two reflective surfaces are relatively tilted and connected to each other, each two adjacent reflection structures are configured to have a gap therebetween, and the light penetration region includes the gap.

8. The reflective mirror according to claim 1, wherein each reflection structure comprises two reflective surfaces and a light penetration part, the two reflective surfaces are relatively tilted to each other, the light penetration part is connected between the two reflective surfaces, and the light penetration region includes the light penetration part.

9. The reflective mirror according to claim 8, wherein each two adjacent reflection structures are connected to each other.

10. The reflective mirror according to claim 8, wherein each two adjacent reflection structures are configured to have a gap therebetween, and the light penetration region further includes the gap.

11. The reflective mirror according to claim 1, wherein each reflection structure has a top surface, on which a plurality of V-shaped grooves are disposed, each V-shaped groove is formed by two walls, the reflective surfaces include the walls of the V-shaped grooves, each two adjacent reflection structures are configured to have a gap therebetween, and the light penetration region includes the gap.

12. An optical touch device defined with a sensing area, the optical touch device comprising:

at least a reflective mirror disposed beside at least a side of the sensing area, each reflective mirror comprising:

a reflective film comprising a first connection surface and a plurality of reflection structures opposite to the first connection surface, the reflection structures adjacent to the light source module, each reflection structure protruding away from the first connection surface, each reflection structure including a light reflection region and a light penetration region, the light reflection region alternatively arranged with the light penetration region, each reflection structure including at least a reflective surface connected to the light penetration region, and the light reflection region including the reflective surface;

a light-transmitting base comprising a light penetration surface and a second connection surface opposite to the light penetration surface; and a light-transmitting adhesive layer disposed between the reflective film and the light-transmitting base and connected to the first connection surface and the second connection surface;

a light source module disposed beside the sensing area and configured to provide light to the sensing area; and a light sensing module disposed beside the sensing area and has a field of view of at least one reflective mirror;

wherein the light provided by the light source module is capable of passing through the light penetration region and thereby emitted to the light sensing area.

13. The optical touch device according to claim 12, wherein the reflective film is a prism film, each reflection structure is a prism pillar, the prism pillars are arranged to be parallel to each other, and each two adjacent prism pillars are connected to each other.

14. The optical touch device according to claim 13, wherein each reflection structure is a triangular pillar.

15. The optical touch device according to claim 14, wherein each reflection structure has a vertex-angle ranged from 86 to 94 degrees.

16. The optical touch device according to claim 13, wherein the first connection surface is rectangular and has two long sides and two short sides, each reflection structure has a long-axis parallel to the long sides of the first connection surface.

17. The optical touch device according to claim 12, wherein the light-transmitting base further comprises a diffusion structure disposed on the light penetration surface.

18. The optical touch device according to claim 12, wherein each reflection structure comprises two reflective surfaces, the two reflective surfaces are relatively tilted and connected to each other, each two adjacent reflection structures are configured to have a gap therebetween, and the light penetration region includes the gap.

19. The optical touch device according to claim 12, wherein each reflection structure comprises two reflective surfaces and a light penetration part, the two reflective surfaces are relatively tilted to each other, the light penetration part is connected between the two reflective surfaces, and the light penetration region includes the light penetration part.

20. The optical touch device according to claim 19, wherein each two adjacent reflection structures are connected to each other.

21. The optical touch device according to claim 19, wherein each two adjacent reflection structures are configured to have a gap therebetween, and the light penetration region further includes the gap.

22. The optical touch device according to claim 12, wherein each reflection structure has a top surface, on which a plurality of V-shaped grooves are disposed, each V-shaped groove is formed by two walls, the reflective surfaces include the walls of the V-shaped grooves, each two adjacent reflection structures are configured to have a gap therebetween, and the light penetration region includes the gap.

* * * * *